United States Patent [19]
Schmidt

[11] 3,737,086
[45] June 5, 1973

[54] FILM RETENTION MEANS FOR FILM CARTRIDGES

[75] Inventor: Josef Schmidt, Chicago, Ill.

[73] Assignee: Bell & Howell Company, Chicago, Ill.

[22] Filed: Sept. 23, 1971

[21] Appl. No.: 183,125

[52] U.S. Cl. .................. 226/11, 352/78, 226/127, 242/57
[51] Int. Cl. .............................................. B65h 25/00
[58] Field of Search .............. 226/11, 127; 242/57; 352/78

[56] References Cited
UNITED STATES PATENTS

| | | | |
|---|---|---|---|
| 3,559,918 | 2/1971 | Braun | 352/78 R |
| 3,458,157 | 7/1969 | Wells | 242/57 X |
| 2,755,030 | 7/1956 | D'ornellas | 242/57 X |

*Primary Examiner*—Allen N. Knowles
*Attorney*—Kenneth W. Greb, John E. Peele, Jr., William K. Serp and Nicholas A. Camasto

[57] ABSTRACT

A film cartridge for a projector having an end of film sensing means for blocking the film driving means from feeding film into the cartridge while maintaining engagement of the film end with the driving means whereby the driving means can conveniently feed the film out of the cartridge.

2 Claims, 4 Drawing Figures

PATENTED JUN 5 1973

3,737,086

FILM RETENTION MEANS FOR FILM CARTRIDGES

This invention relates to an end of film retention means for film cartridges for use in a projector, and is particularly concerned with means for maintaining the engagement of the film apertures with the sprocket teeth at all times, so that after the filmstrip has been rewound in the magazine, it is not necessary to re-engage the film apertures with the sprocket teeth in order to pull the filmstrip out of the magazine.

Although the structure of the present invention is designed specifically for use in handling filmstrips that are usually driven intermittently to project each frame separately, it will be understood that the invention is also applicable to film that is projected as a continuous operation.

BACKGROUND OF THE INVENTION

In the projection of a filmstrip, it is customary to rewind the filmstrip in the magazine after it has been projected. In cartridges, the filmstrip is driven by sprocket wheels that are rotated manually or by any suitable reversible motor with radially projecting teeth engaging the film apertures. Heretofore it has been practically impossible to rewind the filmstrip in the magazine and stop the drive means before total disengagement of the film apertures and the driving teeth. Therefore it has been necessary to re-engage the apertures adjacent the trailing end of the filmstrip with the driving teeth in order to pull the filmstrip out of the magazine when the teeth are rotated in the opposite direction.

SUMMARY OF THE INVENTION

In the cartridge constructed in accordance with the present invention, the movement of the filmstrip into the magazine is stopped automatically while the apertures adjacent the trailing end of the filmstrip are still engaged by the teeth of the sprocket wheels. When the rotation of the sprocket wheels is reversed, the teeth pull the film out of the magazine, thus eliminating the necessity of re-engaging the film apertures with the teeth.

The cartridge is similar in many respects to the cartridge disclosed in the co-pending applications, Ser. No. 97,859, filed Dec. 14, 1970, now U.S. Pat. No. 3675994, and Ser. No. 163,155, filed July 16, 1971, and assigned to the same assignee as this invention. The essential difference between the cartridges is that in the co-pending application the film feed is stopped without stopping the rotation of the sprocket wheels, and in this application the film feed is stopped by stopping the rotation of the sprocket wheels.

The object of the present invention is to provide an end of film retention means for a projector including a cartridge for storing film, a driving means for feeding film into and out of the cartridge, and an end of film sensing means operable for blocking the film driving means from feeding film into the cartridge while maintaining engagement of the film end with the driving means.

Suitable structure by means of which the above noted and other advantages are attained will be fully described in the following specification, taken in conjunction with the accompanying drawings showing a preferred embodiment of the invention; in which.

DESCRIPTION OF THE ILLUSTRATED EMBODIMENT

Figure 1:
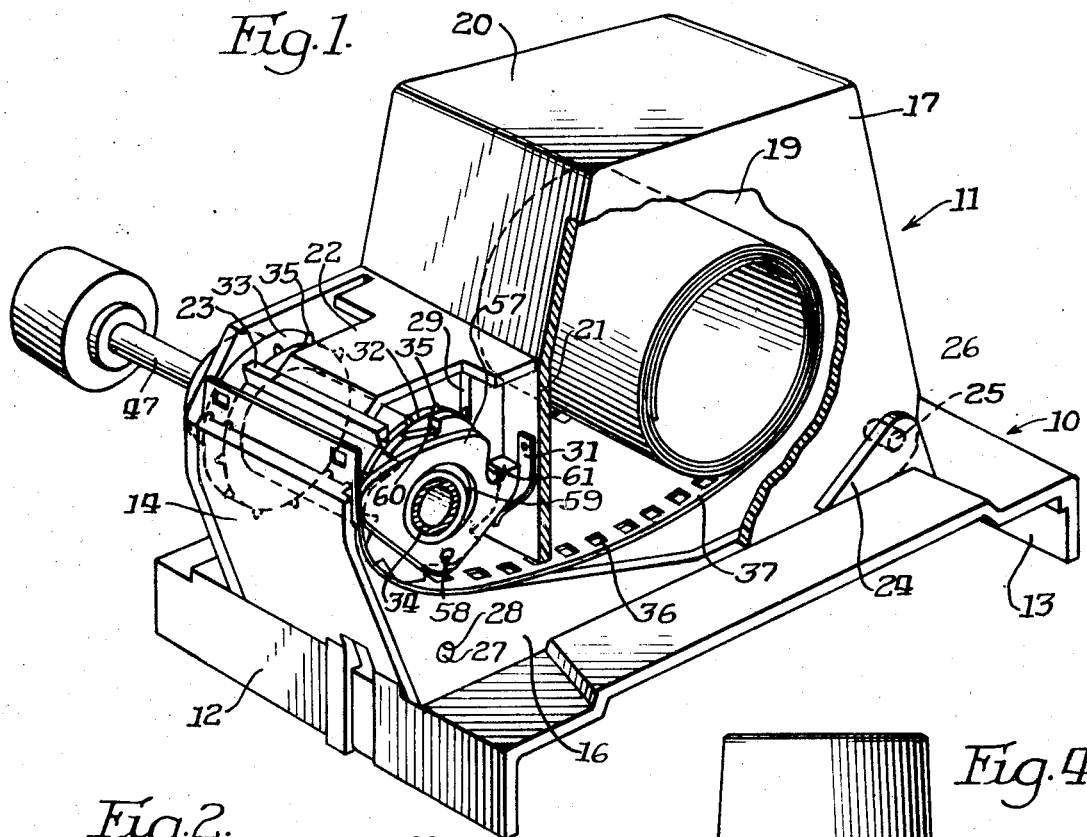
FIG. 1 is a perspective view of a cartridge embodying the invention with one side broken away to illustrate the interior structure.
Figure 2:
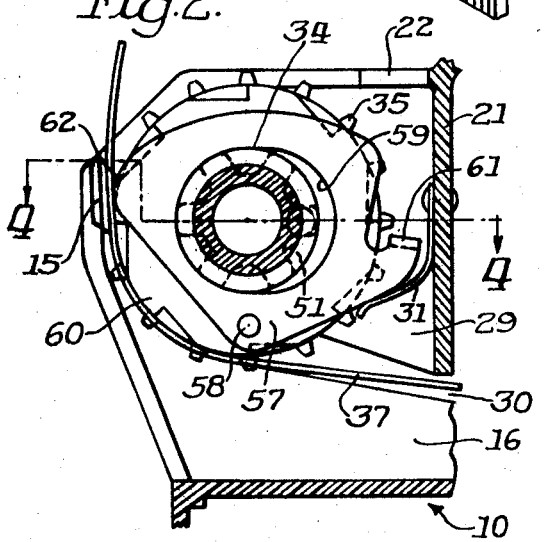
FIG. 2 is a side elevational view with one side wall of the cartridge removed showing the invention in a film feeding condition.
Figure 3:
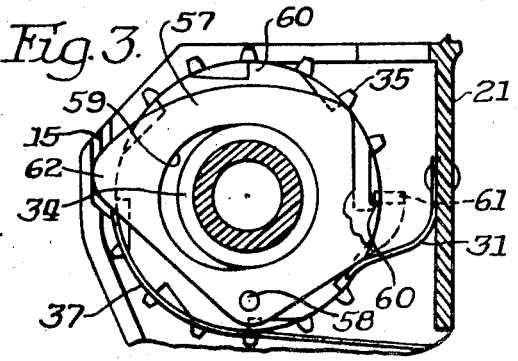
FIG. 3 is a view similar to the left end portion of FIG. 2 showing the invention in a film blocking condition.
Figure 4:
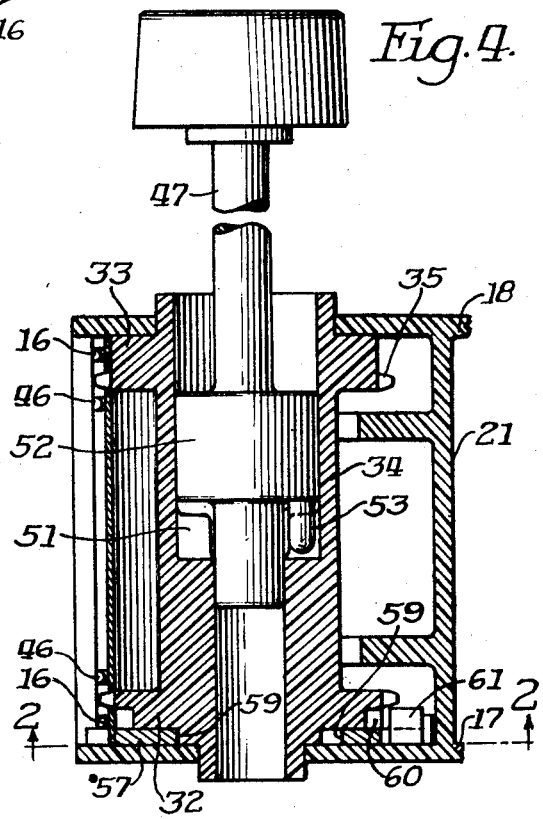
FIG. 4 is a cross-sectional view taken along the line 4—4 of FIG. 2.

In the drawings, the cartridge comprises a base 10 and a housing 11 each preferably molded of suitable plastic material as a separate integral unit. The housing comprises a roller feed compartment and a magazine, as hereinafter described. The base is provided with two depending walls 12 and 13 shaped to be interengaged with means on a projector for detachably securing the cartridge to the projector. A front wall 14 projects upwardly at a slight forward angle from the front end of the base 10. The upper edge of the front wall 14 is provided with a recess 15 in its inner surface adjacent one end thereof for a purpose hereinafter disclosed. A pair of longitudinally extending parallel guide rails 16 project inwardly from the inner surface of the front wall and upwardly from the base throughout the length of the roller feed compartment and into the magazine. The guide rails are spaced apart a distance slightly less than the width of the filmstrip and are adapted to engage the longitudinal edge portion of the filmstrip outwardly of its apertures to support it as it is moved into or out of the magazine.

The housing 11 comprises a pair of side walls 17 and 18 that cooperate with a back wall 19, a top wall 20, and a vertically disposed intermediate wall 21 depending from the front edge of the top wall 20 to form a magazine in which the filmstrip is stored in coiled form. The walls of the magazine cause the filmstrip to be wound in coil formation as it is fed into the magazine, but, if desired, the magazine may be provided with a spring pressed arcuate plate that restrains the coiled filmstrip in the magazine, as disclosed in the above-identified co-pending application.

The housing also includes a horizontally disposed wall 22 that extends forwardly from the wall 21 intermediate its height and cooperates with the wall 21, the side walls 17 and 18 forwardly of the wall 21, and the front wall 14 to form a roller feed compartment. The forward end of the wall 22 slops downwardly and has a transversely extending stripper plate 23 at its forward end in spaced relationship to the upper edge of the front wall 14.

The rear end of the housing 11 is pivotally secured to the base 10 by interengageable pin and aperture connections. The base is provided with a pair of parallel ears 24 that project upwardly from the rear end portion of the base outwardly of the guide rails 16. Each ear has a hinge pin 25 projecting inwardly therefrom in axial alignment. Each of the side walls 17 and 18 has an aperture 26 adapted to be aligned with the hinge pins 25. The side walls 17 and 18 are sufficiently resilient to be snapped into place with the apertures 26 engaging the adjacent hinge pins 25. The front end of the housing 11 may be detachably secured to the base in any suitable manner. Preferably each of the guide rails 16 has a boss 27 projecting outwardly therefrom. The side walls 17 and 18 are each provided with an aperture 28 that are adapted to be snapped over the bosses 27 to hold the housing in its closed position. The outer ends of the bosses 27 are rounded to permit the side walls to be readily disengaged from the bosses when the cartridge is to be opened.

The lower portion of the vertical wall 21, which separates the roller feed compartment from the magazine, is reinforced by laterally spaced vertical flanges 29 that project forwardly into the feed roller compartment. The vertical wall 21 and the flanges 29 terminate a short distance above the upper edges of the guide rails 16 to provide a horizontal passageway 30 through which the filmstrip passes as it is fed into and out of the magazine. A spring 31 has one end secured to the lower portion of the wall 21 adjacent the side wall 17. The lower end of the spring 31 projects forwardly into the roller feed compartment for a purpose hereinafter disclosed.

The means for feeding the film in both directions comprises a pair of sprocket wheels 32 and 33 integral with a tubular member 34 axially aligned therewith. Each of the sprocket wheels 32 and 33 is provided with a plurality of radially extending sprocket teeth 35 spaced circumferentially to coincide with the longitudinal spacing of the apertures 36 in a conventional filmstrip 37. The lateral spacing between the teeth of sprocket wheels 32 and 33 is the same as the lateral spacing between the apertures 36. The forward end portions of the side walls 17 and 18 have suitable provisions for pivotably supporting the tubular member 34.

When the tubular member 34 is mounted in the fed roller compartment, the front peripheral edge portions of the sprocket wheels are close to the upper edge portion of the front wall 14 and form a restricted zone adjacent the upper edge of the front wall 14. The circumference described by the outer edges of the teeth 35 extends forwardly of the plane described by the outer edges of the guide rails 16 projecting rearwardly from the inner surface of the front wall 14. A pair of ribs 46 extend rearwardly from the front wall 14 in transversely spaced relationship between the guide rails 16. The ribs 46 are parallel to the guide rails 16 and project inwardly to the same extent as the guide rails 16. As the filmstrip 37 enters the restricted zone between the sprocket wheels 32 and 33 and the front wall 14, the guide rails 16 and the ribs 46 press the film toward the sprocket wheels 32 and 33 to move the apertures 36 of the film 37 into driving engagement with the sprocket teeth 32 and 33. The stripper plate 23 insures separation of the film 37 from the sprocket teeth 32 and 33 as the film 37 moves upwardly out of the restricted zone. The apertures 36 of the film 37 moving downwardly through the restricted zone remain in engagement with the sprocket teeth 32 and 33 until the teeth pass through the vertical plane at the lowermost edge of the sprocket wheels 32 and 33.

The sprocket wheels 32 and 33 are driven by a shaft 47 rotatably mounted in the axial bore of the tubular member 34. The shaft 47 may be rotated manually or by any suitable reversible motor. The shaft 47 has an axially extending finger 53 engageable with a toothed portion 51 in the tubular member 34 for rotating the sprocket wheels 32 and 33 in either direction. Rotation of the sprocket wheels 32 and 33 in one direction, with the sprocket teeth 35 engaging the apertures 36 of the film 37, pulls the film 37 out of the magazine, and rotation in the opposite direction pushes the film 37 into the magazine.

A plate 57 positioned between the sprocket wheel 32 and the side wall 17 is pivotally mounted on a pin 58 projecting inwardly from the side wall 17. The plate 57 has an opening 59 through which the tubular member 34 extends. The opening 59 is larger than the cross-sectional area of the tubular member 34 to permit the plate 57 to move pivotally about the pin 58 which is located outside the perimeter of the opening 59.

The outer side of the sprocket wheel 32, adjacent the plate 57, is recessed at a plurality of circumferentially spaced intervals to provide a plurality of ratchet teeth 60 each having its outer end extending radially inwardly from the peripheral edge of the sprocket wheel. Rotation of the sprocket wheels 32 and 33 is stopped instantaneously by engagement of any of said ratchet teeth 60 by a pawl 61 that projects outwardly and perpendicularly from a peripheral edge portion of the plate 57. The base of the pawl 61 is engaged by the free end of the spring 31 which exerts a constant force urging the plate 57 pivotally into the position in which the pawl 61 engages one of the ratchet teeth 60 to stop rotation of the sprocket wheels 32 and 33. The plate 57 is so shaped that when the pawl 61 is in engagement with any one of the ratchet teeth 60, one peripheral edge portion 62 of the plate extends into the recess 15.

When a filmstrip 37 is being fed into the magazine, the film passing through the restricted zone between the front wall 14 and the sprocket wheels 32 and 33 covers the recess 15, thereby preventing entrance of the peripheral edge portion 62 of the plate 57 into the recess 15. The film 37 covering the recess 15 thus prevents pivotal movement of the plate 57 into the position in which the pawl 61 engages one of the ratchet teeth 60 to stop the rotation of the sprocket wheels 32 and 33. As the trailing end of the film moves past the restricted zone, it clears the recess 15 and the spring 31 moves the plate 57 pivotally until the peripheral edge portion 62 of the plate 57 enters the recess 15 and the pawl 61 moves into engagement with one of the ratchet teeth 60 to block the rotation of the sprocket wheels 32 and 33 before the apertures 36 of the trailing end of the filmstrip 37 are separated from the sprocket teeth 35. Since the sprocket teeth 35 are still in engagement with the apertures 36 in the trailing end of the filmstrip 37, the filmstrip 37 may be fed in the opposite direction, out of the magazine, by merely reversing the rotation of the sprocket wheels 32 and 33 without any necessity of re-engaging the sprocket teeth 35 with the film apertures 36.

What is claimed is: 1. An apparatus for retaining the free end of a film in a cartridge driven by a motor within a projector comprising:
 storage means for the film;
 means coupled to the projector motor for driving the film to and from said storage means; and
 means sensing the end of the film for blocking said driving means to maintain engagement of the film with said driving means;
 said sensing means having a first position determined by the presence of film permitting film movement by said driving means and having a second position determined by the absence of film for stopping film movement by blocking said driving means, said sensing means being normally urged toward said second position;

said sensing means including a plate having a first position determined by the presence of film for permitting film movement by said driving means and a second position determined by the absence of film for stopping film movement by blocking said driving means; and supporting means including a pivot means for supporting said plate for movement between said first and second positions and means for biasing said plate toward said second position about said pivot means;

said driving means including a tooth member and said plate including a pawl for engaging said tooth member for blocking said driving means.

2. A film cartridge comprising:

a magazine;

a sprocket wheel rotatably mounted adjacent said magazine, said sprocket wheel having a plurality of teeth engageable with apertures in a filmstrip;

means for rotating said sprocket wheel in opposite directions with said teeth engaging said filmstrip apertures to feed said filmstrip into and out of said magazine;

a plate operable to engage said sprocket wheel for preventing rotation of said sprocket wheel in one direction; and a spring biasing said plate against said filmstrip and toward engagement with said sprocket wheel whereby said spring moves said plate into engagement with said sprocket wheel when the trailing end of the film passes said plate and the trailing end of said filmstrip remains in engagement with said sprocket wheel to permit said rotating means to feed said filmstrip out of said magazine.

* * * * *